(12) United States Patent
Dutkin et al.

(10) Patent No.: US 10,946,768 B2
(45) Date of Patent: Mar. 16, 2021

(54) WIRELESS AND REDUNDANT VEHICULAR MASS DETECTION SYSTEMS AND METHODS

(71) Applicant: C-Safe Solutions, Inc., Austin, TX (US)

(72) Inventors: Gage Dutkin, Austin, TX (US); George Grossling, Austin, TX (US)

(73) Assignee: C-SAFE SOLUTIONS, INC., Austin, TX (US)

( * ) Notice: Subject to any disclaimer, the term of this patent is extended or adjusted under 35 U.S.C. 154(b) by 0 days.

(21) Appl. No.: 16/578,325

(22) Filed: Sep. 21, 2019

(65) Prior Publication Data

US 2020/0094709 A1 Mar. 26, 2020

Related U.S. Application Data

(60) Provisional application No. 62/734,444, filed on Sep. 21, 2018.

(51) Int. Cl.
*B60N 2/00* (2006.01)
*B60R 99/00* (2009.01)
*G08B 21/24* (2006.01)
*G08B 21/22* (2006.01)
*B60N 2/28* (2006.01)

(52) U.S. Cl.
CPC .............. *B60N 2/002* (2013.01); *B60N 2/28* (2013.01); *B60R 99/00* (2013.01); *G08B 21/22* (2013.01); *G08B 21/24* (2013.01)

(58) Field of Classification Search
CPC .......... B60N 2/002; B60N 2/28; B60R 21/01; B60R 99/00; G08B 21/22; G08B 21/24
See application file for complete search history.

(56) References Cited

U.S. PATENT DOCUMENTS

| | | |
|---|---|---|
| 6,922,147 B1 | 7/2005 | Viksnins et al. |
| 7,012,533 B2 | 3/2006 | Younse |
| 7,230,530 B1 | 6/2007 | Almquist |
| 7,250,869 B2 | 7/2007 | Davis |
| 7,378,979 B2 | 5/2008 | Rams, Jr. |
| 7,466,217 B1 | 12/2008 | Johnson et al. |
| 7,714,737 B1 | 5/2010 | Morningstar |
| 8,058,983 B1 | 11/2011 | Davisson et al. |

(Continued)

FOREIGN PATENT DOCUMENTS

WO 2016140669 A1 9/2016

*Primary Examiner* — Nader Bolourchi
(74) *Attorney, Agent, or Firm* — RM Reed Law PLLC

(57) ABSTRACT

A system may be integrated within or coupled to a vehicle, in a car seat, a seat cover, a pad, or another device. The system may determine placement of an object within the vehicle. When the driver parks and turns off the vehicle, the system may provide one or more visible or audible indicators to remind the user to check the back seat, trunk, or storage area of the vehicle. The audible indicators may utilize the speakers of the vehicle or the car horn. The visible indicators may include turning on or flashing interior or exterior lights, displaying information on a dashboard display or on a projected or augmented display on the windshield, and so on. In some instances, the system may send an alert to a smartphone, a key fob, another electronic device, or an emergency system to prevent overheating of an infant, a pet, groceries, and so on.

21 Claims, 12 Drawing Sheets

(56) References Cited

U.S. PATENT DOCUMENTS

| | | |
|---|---|---|
| 8,063,788 B1 | 11/2011 | Morningstar |
| 8,816,845 B2 | 8/2014 | Hoover et al. |
| 9,378,641 B2 | 6/2016 | Beumler |
| 9,604,571 B1 | 3/2017 | Kurtovic |
| 9,937,830 B1 | 4/2018 | Curry |
| 2006/0139159 A1 | 6/2006 | Lee et al. |
| 2007/0052529 A1 | 3/2007 | Perez |
| 2007/0096891 A1 | 5/2007 | Sheriff et al. |
| 2008/0157985 A1 | 7/2008 | Wilson |
| 2010/0090836 A1 | 4/2010 | Trummer |
| 2012/0049495 A1 | 3/2012 | Harris |
| 2012/0050021 A1 | 3/2012 | Rao et al. |
| 2012/0232749 A1 | 9/2012 | Schoenberg et al. |
| 2013/0049946 A1 | 2/2013 | Chavez |
| 2013/0109342 A1 | 5/2013 | Welch |
| 2015/0274036 A1 | 10/2015 | Arad et al. |
| 2016/0042616 A1 | 2/2016 | Dorsey |
| 2016/0200248 A1 | 7/2016 | Singh et al. |
| 2016/0210843 A1 | 7/2016 | Killette et al. |
| 2017/0197548 A1 | 7/2017 | Thomas |
| 2017/0263098 A1 | 9/2017 | Garcia |
| 2018/0053397 A1* | 2/2018 | Kaur ............... G08B 21/24 |
| 2018/0130327 A1 | 5/2018 | Rogers et al. |

* cited by examiner

WIRELESS AND REDUNDANT VEHICULAR MASS DETECTION SYSTEMS AND METHODS

The present disclosure is a nonprovisional of and claims priority to U.S. Provisional Patent Application No. 62/734,444 filed on Sep. 21, 2019 and entitled "Wireless and Redundant Mass Detection Systems and Methods", which is incorporated herein by reference in its entirety.

FIELD

The present disclosure is generally related to safety alerting systems, and more particular to an automotive safety alerting system configured to alert the user when a mass, such as an infant, a food item, or another object is left unattended in a vehicle.

BACKGROUND

Every year, dozens of incidents occur where an adult accidentally leaves an animal or a child unattended in a vehicle. Such exposure can cause severe damage and can even be fatal, depending on the extent of the exposure. A young child's body cannot regulate heat like an adult's body can, and thus children are at the highest risk of vehicular heatstroke. In fact, a child's body temperature can rise three to five times faster than an adult's body temperature when exposed to the same environment. Deaths among children have been recorded when left unattended in vehicles in outside temperatures in the low 60s. In the U.S. there is an average of 38 child vehicular heatstroke deaths per year. The majority of these deaths are preventable.

As daily routines like dropping a child off at daycare become habit, the brain uses those habits and turns them into semantic memories. Semantic memories help turn habits into autopilot. As a parent becomes more accustomed to the routine of dropping his or her child off on a daily basis, the parent may begin to subconsciously turn on autopilot. Unfortunately, when a sudden change in routine occurs, or an especially stressful day occurs, that autopilot can become interrupted and catastrophe can occur. The most common instances of vehicular heatstroke involve parents who experience a sudden change in routine, who are sleep deprived, or who have experienced an especially busy day.

SUMMARY

Embodiments of systems, methods, and devices described below can be used to provide a child safety mechanism that is independent of the parent's daily routine. Additionally, to provide a solution that can prevent death, the systems, methods, and devices may include a failsafe mechanism, which may be built in. Further, in addition to providing a child safety mechanism, other applications are also possible. For example, at least one embodiment of the systems, methods, and devices may be configured to provide a safety mechanism for pets. In still another embodiment, the systems, methods, and devices may be configured to monitor perishable items, such as chemicals, liquids, and food, which can be forgotten or poorly maintained, causing hazardous conditions, damage, spoilage, waste, or any combination thereof. The systems, methods, and devices may be configured to alert a user so that the user does not inadvertently forget and leave the items in an unattended vehicle, for example.

Embodiments of systems, methods, and devices are described below that can be configured to provide a failsafe to remind the user of the mass in the vehicle. In some instances, the failsafe may include an infant car seat, a seat cover, or another device that may include a circuit configured to detect the presence of a mass, such as an infant, a pet, food items, or another mass. In response to detecting the mass, the circuit may establish a communication link with at least two electronic devices associated with one or more associated users. The electronic devices can include a mobile phone, a wearable electronic device (such as a key fob, a smart watch, or another wearable device), another electronic device, or any combination thereof. The circuit may then monitor the presence of the mass and the proximity of the electronic devices and may selectively generate an alert to the electronic devices and optionally to other devices when the mass is left unattended for a predetermined amount of time.

In some embodiments, the circuit may monitor the proximity of each of the electronic devices. When one of the electronic devices leaves the vicinity of the circuit and the mass (such as an infant) is still present, the circuit may initiate a timer. If the time exceeds a predetermined threshold before the electronic device returns, the circuit may send an alert to each of the electronic devices. If, after a second period of time, the electronic device has not returned and the mass is still present, the circuit may send a second alert to law enforcement, to another device, or any combination thereof.

In some embodiments, a device may include a processor, a transceiver, and a transducer. The transducer may be configured to determine the presence of a mass, to establish communications links with at least two electronic devices, and transition from a low-power state to an armed state in response to determining the presence of the mass. In the armed state, the circuit may then monitor the proximity of the electronic devices and the presence of the mass and may selectively generate an alert when the mass is left unattended based on the at least one of the electronic devices leaving a proximity of the circuit. In one possible example, the alert may be generated when the electronic device does not return to within a predetermined range of the circuit within a first period of time. A second alert may be generated when the electronic device fails to return within the predetermined range of the circuit within a second period of time.

In still another embodiment, an apparatus may include a transceiver, a detector circuit, and a processor coupled to the transceiver and the detector circuit. The detector circuit may be configured to generate a signal in response to a presence of a mass (such as an infant). The processor may be configured to establish a communications link with at least two portable electronic devices in response to the signal from the detector circuit. In one aspect, the apparatus may be one of an infant car seat, a booster seat, and a seat cover.

In yet another embodiment, a system may include a device, a wearable device, and at least one other electronic device, such as a smartphone. The wearable device may include a transceiver, a detectable indicator (such as a light-emitting diode (LED), a speaker, a piezoelectric element, a haptic feedback mechanism, or any combination thereof), and a processor coupled to the transceiver, the LED, and the speaker. The device may include a circuit including a transceiver, a detector circuit configured to generate a signal in response to a presence of a mass; and a processor coupled to the transceiver and the detector circuit. The processor may be configured to establish a communications link with the wearable device and at least one other portable electronic device in response to the signal from the detector circuit.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
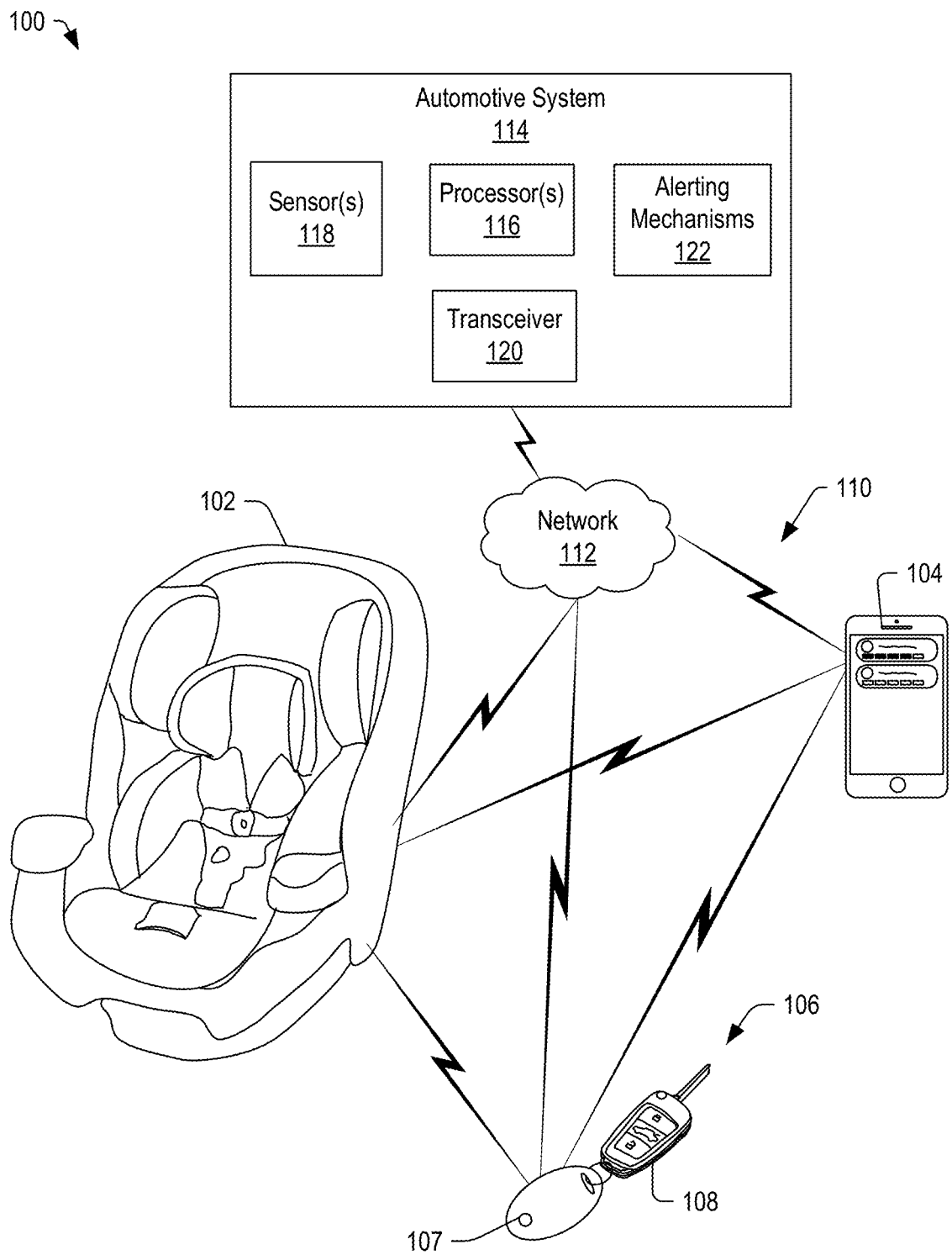
FIG. 1 depicts a diagram of an automotive safety alerting system, in accordance with certain embodiments of the present disclosure.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION OF ILLUSTRATIVE EMBODIMENTS

Embodiments of systems, devices, and methods are described below that may monitor a vehicle to provide warnings related to leaving children, animals, or items behind in an enclosed vehicle in the heat. For example, the system may determine that the user has parked and turned off the vehicle, and may provide visible or audible indicators to remind the driver to check the back seat or the rear of the vehicle when the vehicle is parked and turned off. These visible or audible indicators may be provided based on a determination that the user opened a back door, hatch back, or trunk of the vehicle at some point during the particular driving session, such as at the start, at a stop, and so on. The visible or audible indicators may include the car speakers, dome lights, door lights, headlamps, hazard lights, turn signals, brake lights, dashboard display, projected or augmented display, car horn, other elements, or any combination thereof. Additionally, the system may communicate an alert to one or more devices, such as smartphones, wearable devices (e.g., key fobs, a smart watch, or other wearable devices), emergency systems, other devices, or any combination thereof.

In some implementations, the system may include a circuit integrated within a vehicle or coupled to the vehicle (such as within a car seat) that is configured to detect the presence of a mass and to monitor proximity of one or more electronic devices. When the mass is not present, the circuit may remain in a low-power state. When the mass is present, the circuit may establish communications links with one or more electronic devices (e.g., a smartphone and a key fob or other wearable device) and may monitor the presence of the mass and the proximity of the one or more electronic devices. If one or more of the electronic devices moves away from a physical location of the circuit, the circuit may start a timer and may send an alert to the electronic devices when the time exceeds a threshold time before the electronic device returns. The circuit may initiate secondary measures, such as notifying law enforcement or calling a secondary device, when the electronic device fails to return and the time exceeds a second threshold time. Other embodiments are also possible.

In some implementations, the circuit may be included within a vehicle and may be integrated as part of the vehicle system. In other implementations, the circuit may be included in an after-market product, such as an infant car seat, a seat cover, and so on. In an example, the circuit may be included within or attached to an infant car seat to detect the presence of an infant. The circuit may be coupled to a battery pack. Further, the circuit may include a processor, one or more sensors (including a temperature sensor, a pressure sensor, an optical sensor, other sensors, or any combination thereof), an optional microphone, an optional speaker, a status indicator, and a transceiver configured to communicate wirelessly with one or more electronic devices, such as a wearable device (e.g., a key fob, a smart watch, or another wearable device), a smartphone, another computing device, or any combination thereof.

The system may include a wearable device that may include a transceiver, a processor, a battery, and an indicator (such as a speaker, a light-emitting diode, or other audible or visible indicator). The wearable device may be responsive to a wireless signal from the circuit and, in response to the wireless signal, may activate the indicator to flash, emit sound, vibrate, or otherwise alert the user that the circuit requires attention. In an integrated system implementation, the wearable device may be part of a key chain or may be integrated within the car key. In an after-market system implementation, the wearable device may be attached to the car key. Other implementations are also possible.

The system may further include a software application that may be executed by a processor of a smartphone. The software application may be accessible by a user through a touchscreen interface to synchronize the smartphone to the circuit and to configure one or more alert preferences for the circuit. In some possible embodiments, the user may configure a time threshold that may be communicated to the circuit and that may be used by a processor of the circuit to determine how long to wait before sending an alert. The software application may also allow the user to specify one or more additional devices to contact when an alert is generated. One possible embodiment of an automotive safety alerting system is described below with respect to FIG. 1.

FIG. 1 depicts a diagram of an automotive safety alerting system 100, in accordance with certain embodiments of the present disclosure. The system 100 may include a device 102, such as an infant car seat, including a circuit (shown in FIG. 3) configured to communicate with at least two electronic devices, such as a smartphone 104 and wearable device (e.g., a key fob 106). In the illustrated example, the fob 106 may be a key fob that can be coupled to a key 108, such as a car key. In another example, the fob 106 and the key 108 may be combined. In still another example, instead of the fob 106 or in addition to the fob 106, the system 100 may include one or more other wearable devices, such as smartwatches and the like. Other embodiments are also possible.

In some embodiments, the device 102, the smartphone 104, and the fob 106 or other wearable device may communicate through wireless communications links 110, such as Bluetooth® communications links. When the smartphone 104 and the fob 106 move outside of range of a Bluetooth® wireless mesh, the circuit of the device 102 may communicate a signal to a network 112, such as a cellular, digital, or satellite network. In other embodiments, upon removal of a particular device (e.g., the smartphone 104, the fob 106, or another paired electronic device) from the proximity (i.e., Bluetooth® signal range) of the circuit, a circuit within the smartphone 104 or fob 106 may initiate a timing operation and may generate a user-detectable alert (audible, visible, or both) when the timer expires before the device reestablishes a communications link with the circuit. Other embodiments are also possible.

The circuit associated with the device 102 may include a processor, a transducer, a communications circuit (or transceiver), and a battery pack. Optionally, the device 102 may include a thermal sensor, a speaker, a connection status indicator, a battery indicator, a microphone, other circuitry, or any combination thereof.

The smartphone 104 may include a processor, a memory, and one or more transceivers configured to communicate data to paired devices and through a communications network 112. The smartphone 104 may be configured to execute a safety alerting application, which may provide a device connectivity indicator, a battery level indicator for both the device 102 and the fob 106, and a mass presence indicator. Additionally, the safety alerting application may provide background proximity measurement data and seat management functionality, enabling connectivity to multiple safety devices and associated fobs. The safety alerting application may include ambient air temperature measurement data and associated temperature warnings. The safety alerting application can include user-accessible functionality accessible by a user to configure secondary countermeasures for emergency situations, such as when one of the paired smartphone 104 and the paired fob 106 or wearable device leave the proximity of the device 102 (or the automotive system 114) while an object is present. The secondary countermeasures can include phone and contact information for emergency dialing and may enable designation of family/friend alert contacts. The safety alerting application may allow a user to configure GPS functionality so that location information can be provided in conjunction with alerts. Other embodiments are also possible.

In some embodiments, the fob 106 or wearable device may include communications circuitry (one or more transceivers), a battery, a processor, a detectable indicator (such as a sound output device, a light-emitting diode (LED), a piezoelectric element, a haptic feedback mechanism, or any combination thereof), and a user-accessible button 107. The button 107 may be accessed by a user to pair the fob 106 to the device 102. In some embodiments, the fob 106 may be configured to be uniquely paired with the device 102 based on preconfigured settings of the device 102 and the fob 106. Other embodiments are also possible. Alternatively, the fob 106 or other wearable device, the device 102, the smartphone 104, or any combination thereof may be paired with an automotive system 114.

In an embodiment, the smartphone 104, the fob 106, and in some instances, an automotive system 114 may cooperate to alert the user to an unattended item (or infant) in contact with the device 102. In an example, the device 102 or the automotive system 114 may be configured to transmit an alert signal (through the network 112 or directly via a short-range wireless communication link, such as a Bluetooth® communication link) to the smartphone 104, causing the smartphone 104 to vibrate, emit sounds, provide a visual indicator (such as a flashing screen), or any combination thereof. Similarly, the device 102 or the automotive system 114 may be configured to transmit an alert signal to the key fob 106 or to another wearable device, causing the fob 106 or wearable device to vibrate, emit sounds, provide a visual indicator (such as a flashing LED), or any combination thereof. The smartphone 104, the fob 106, or any other paired device may serve as both a proximity detection component and an alerting device within the system 100.

The system 100 may include the automotive system 114, which may include a processor 116 coupled to one or more sensors 118. The sensors 118 may include one or more temperature sensors, one or more door sensors (door, trunk, hatchback, etc.), one or more seat sensors (for example, sensors to detect a weight on the seat), one or more pressure sensors (for example, to detect a weight in the rear storage area or trunk), one or more proximity sensors, one or more other sensors, or any combination thereof.

The automotive system 114 may also include one or more transceivers 120 to communicate with one or more other devices, such as the device 102, the smartphone 104, the key fob 106 or key 108, another wearable device, or any combination thereof. The one or more transceivers 120 may communicate with a communications network 112, such as a satellite network, a short-range wireless network, or any combination thereof. The one or more transceivers 120 may also include one or more universal serial bus (USB) interfaces, which may be coupled to the device 102, the smartphone 104, or any combination thereof, to provide power and to receive data.

The automotive system 114 may include one or more alerting mechanisms 122. The alerting mechanisms 122 can include visible or audible indicators via the car speakers, dome lights, door lights, headlamps, hazard lights, turn signals, brake lights, dashboard display, a projected or augmented display, a car horn, other elements, or any combination thereof. Additionally, the alerting mechanisms 122 may include the transceivers 120 to communicate an alert to one or more devices, such as smartphones 104, key fobs 106 or keys 108, other wearable devices, emergency systems, other devices, or any combination thereof.

While an infant car seat is shown, the system may include other types of seats, seat covers, booster seats, other devices, or any combination thereof. Further, the smartphone 104 depicts one possible example of a computing device that can be paired with the infant car seat or with the automotive system 114. However, other types of computing devices are also possible, including tablet computers, laptop computers, personal digital assistants, wearable devices, other data processing devices, or any combination thereof. Additionally, the key fob 106 represents one possible wearable device, and that other wearable devices may also be used in addition to or in lieu of the key fob 106. For example, a wearable device may include an ear piece, a smart watch, or another wearable device. Other implementations are also possible.

Figure 2:
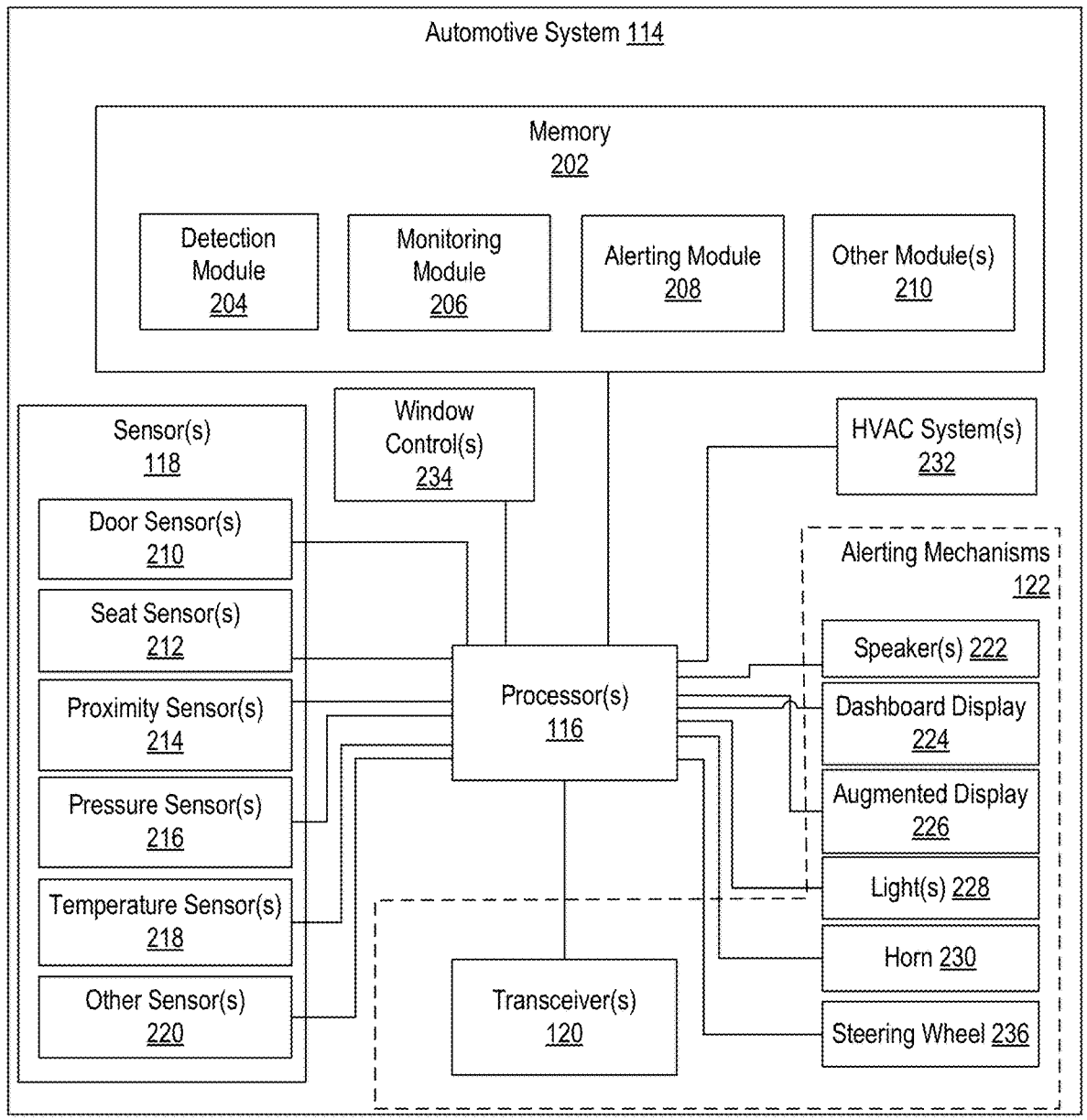
FIG. 2 depicts a block diagram of the automotive system of FIG. 1, in accordance with certain embodiments of the present disclosure.

FIG. 2 depicts a block diagram of the automotive system 114 of FIG. 1, in accordance with certain embodiments of the present disclosure. The automotive system 114 may include a memory 202 coupled to the one or more processors 116, which may be coupled to one or more transceivers 120. The automotive system 114 may further include a plurality of sensors 118 coupled to the processor 116. The plurality of sensors 118 may include one or more door sensors 210, one or more seat sensors 212, one or more proximity sensors 214, one or more pressure sensors 216, one or more temperature sensors 218, and one or more other sensors 220.

The automotive system 114 may further include one or more alerting mechanisms 122 coupled to the processor 116. The alerting mechanisms 122 may include one or more speakers 222, a dashboard display 224, an augmented display 226 (such as a display projected onto the windshield of a car, augmented reality display, and so on), lights (vehicle dome lights, door lights, headlamps, hazard lights, turn signals, brake lights, and so on). The automotive system 114 may also include window controls 234 and HVAC systems 232, which may be coupled to the processor 116.

The memory 202 may store data and processor-readable instructions. The memory 202 may include a detection module 204, which may cause the processor 116 to receive data from the one or more sensors 118. The detection module 204 may be used by the processor 116 to determine an event, such as a door opening event, placement of an object on one of the seats, and so on. Additionally, the detection module 204 may be used by the processor 116 to determine a dangerous temperature event.

The memory 202 may include a monitoring module 206, which may cause the processor 116 to monitor the state of the vehicle as well as the signals from the sensors 118. The monitoring module 206 may cause the processor 116 to determine one or more events and to initiate a timer in response to detecting an event. In an example, when the rear door is opened and closed, the monitoring system 206 may monitor the state of the vehicle and the rear door opening and closing a second time using the door sensors 210. The monitoring system 206 may also monitor for pressure sensor signals from the pressure sensors 216. In response to the car turning off and the pressure sensor signals or door sensor signals indicating that an object may have been placed in the rear seat, the monitoring module 206 may cause the processor 116 to initiate a timer and to trigger an alerting module 208 when the timer value exceeds a threshold value.

The memory 202 may include the alerting module 208. The alerting module 208 may cause the processor 116 to activate one or more of the alerting mechanisms 122 in response to the timer value exceeding the threshold value. The alerting module 208 may also cause the processor 116 to send messages to a smartphone or other device through a communications network 112. For example, the alerting module 208 may cause the processor 116 to control the speakers 222 to provide an audible warning. The alerting module 208 may cause the processor 116 to control the dashboard display 224 to present a visible reminder or warning. The alerting module 208 may cause the processor 116 to control an augmented display 226 to project a visible reminder or warning onto the windshield. The alerting module 208 may cause the processor 116 to control one or more of the lights 228 to provide a visible indicator. The one or more lights 228 may include the dome light, the door lights, the headlights, the hazard lights, the brake lights, the turn signal lights, other lights, or any combination thereof. The alerting module 208 may cause the processor 116 to control the car horn 230 to provide an audible warning or indicator. The alerting module 208 may cause the processor 116 to control a piezoelectric element or other haptic feedback mechanism within a steering wheel 236. Other implementations are also possible.

In some implementations, if the alerting fails, the monitoring module 206 may cause the processor 116 to activate the HVAC system 232 to cool the cabin, to opening one or more of the windows using the window controller 234, or any combination thereof.

The memory 202 may also include other modules 210, which may cause the processor 116 to communicate with one or more other systems, such as an automotive emergency system. The other modules 210 may cause the processor 116 to send a message to an emergency system (such as a 911 System), to send text messages to one or more communication devices, and so on. Other implementations are also possible.

Figure 3:
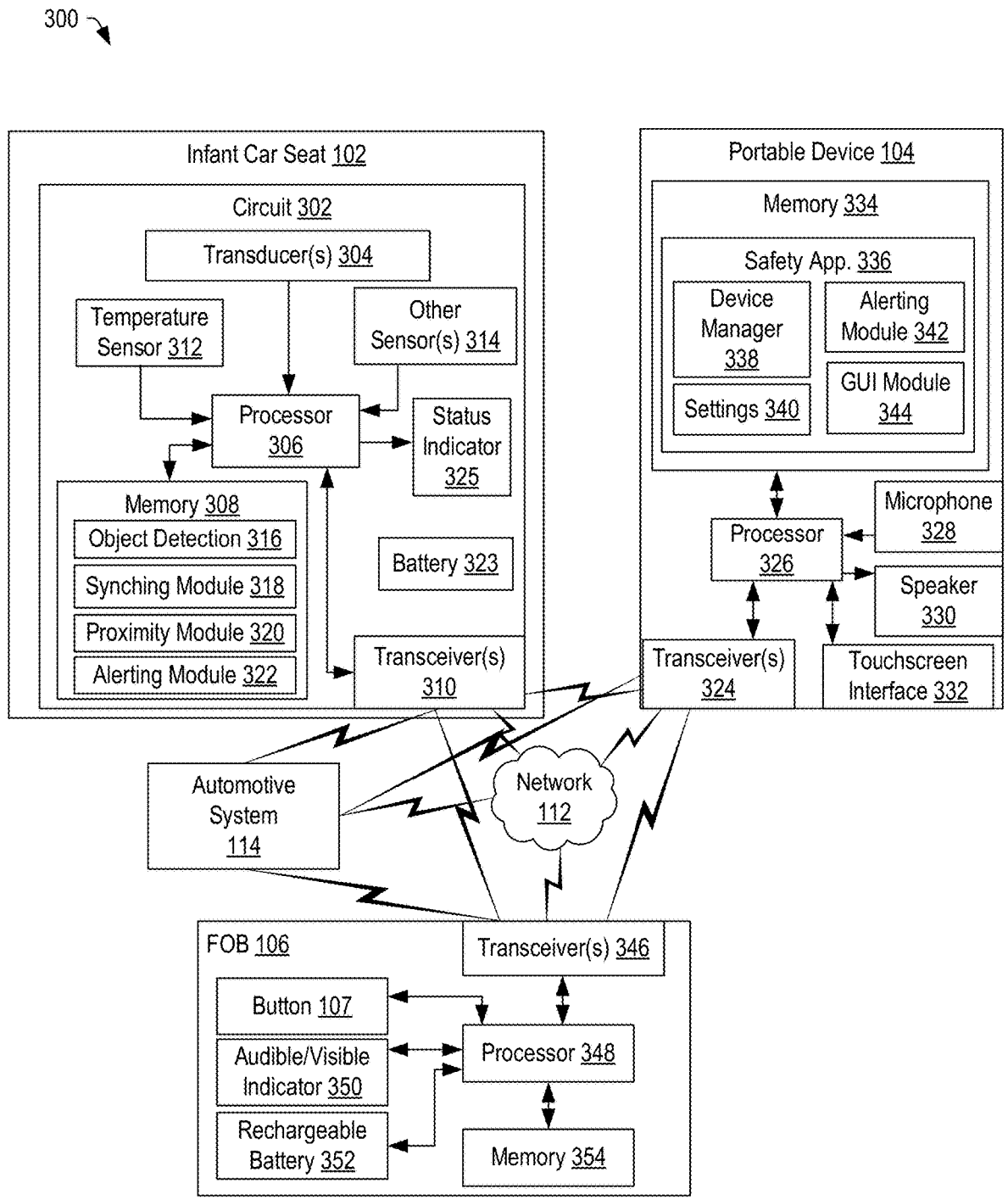
FIG. 3 depicts a block diagram of the automotive safety alerting system of FIG. 1, in accordance with certain embodiments of the present disclosure.

FIG. 3 depicts a block diagram 300 of the automotive safety alerting system 100 of FIG. 1, in accordance with certain embodiments of the present disclosure. The device 102 may include a circuit 302 including one or more transducers 304 and a processor 306 coupled to the transducers 304. The circuit 302 may further include a memory 308, one or more transceivers 310, a temperature sensor 312, and one or more other sensors 314, each of which may be coupled to the processor 306. The processor 306 may also be coupled to a status indicator 325. The circuit 302 may further include or be coupled to a battery 323, which may supply power to the circuit 302.

The memory 308 may be configured to store data and instructions, that when executed, may cause the processor 306 to determine the presence of a mass, such as an infant, and optionally to communicate with the automotive system 114, the portable device 104, and the fob 106 or other wearable device through wireless communications links or through network 112. The memory 308 may include object detection instructions 316 that, when executed, may cause the processor 306 to determine the presence of a mass based on signals from the one or more transducers 304. The memory 308 may further include a synching module 318 that, when executed, may cause the processor 306 to establish communications links with the fob 106 or other wearable device and the portable computing device 104. The memory 308 can further include a proximity module 320 that, when executed, may cause the processor 306 to determine the proximity of the portable device 104 and the fob 106 or other wearable device to the circuit 302, for example, based on signal strength, global positioning satellite (GPS) data, other data, or any combination thereof. The memory 308 may also include an alerting module 322 that, when executed, may cause the processor 306 to selectively send one or more alerts to various devices, including the portable device 104, the fob 106 or other wearable device, other devices, or any combination thereof.

The portable device 104 may be a smartphone, a portable computing device, another device, or any combination thereof. The portable device 104 may include circuitry including one or more transceivers 324, a processor 326 coupled to the one or more transceivers 324, and a touchscreen interface 332 coupled to the processor 326. The circuitry of the portable device 104 may further include a microphone 328, a speaker 330, and a memory 334, each of which may be coupled to the processor 326.

The memory 334 may store data and instructions that, when executed, may cause the processor 326 to communicate with the device 102, the fob 106 or other wearable device, other devices, a network 112, or any combination thereof. Further, the memory 334 may store a safety application 336 that, when executed, may cause the processor 326 to communicate with the device 102 and the fob 106 or other wearable device. The safety application 336 may include a device manager 338 that, when executed, may cause the processor 326 to confirm synchronization with the device 102, to verify battery levels, to rename the devices, to add more devices, and so on.

The memory 334 may further include settings 340, which may be configured by a user by interacting with a graphical interface produced via the GUI module 344. The safety application 336 may further include an alerting module 342 that, when executed, may cause the processor 326 to initiate or produce an alert. Other embodiments are also possible.

The fob 106 or other wearable device can also include one or more transceivers 346 and a processor 348 coupled to the transceivers 346. The fob 106 or other wearable device can further include the user-accessible button 107 coupled to the processor 348, an audible/visible indicator 350 coupled to the processor 348, a rechargeable battery 352 coupled to the processor 348 and other circuitry, and a memory 354 coupled to the processor 348. In some embodiments, in response to user-selection of the button 107, the processor 348 may execute instructions stored in the memory 354 to communicate with the device 102 via the transceiver 346 to establish a communications link (pairing). In some embodiments, the audible/visible indicator 350 may be controlled by the processor 348 to light up when the link is established and may be controlled to flash (and optionally to emit noise) when an alert is generated. Other embodiments are also possible.

Figure 4:
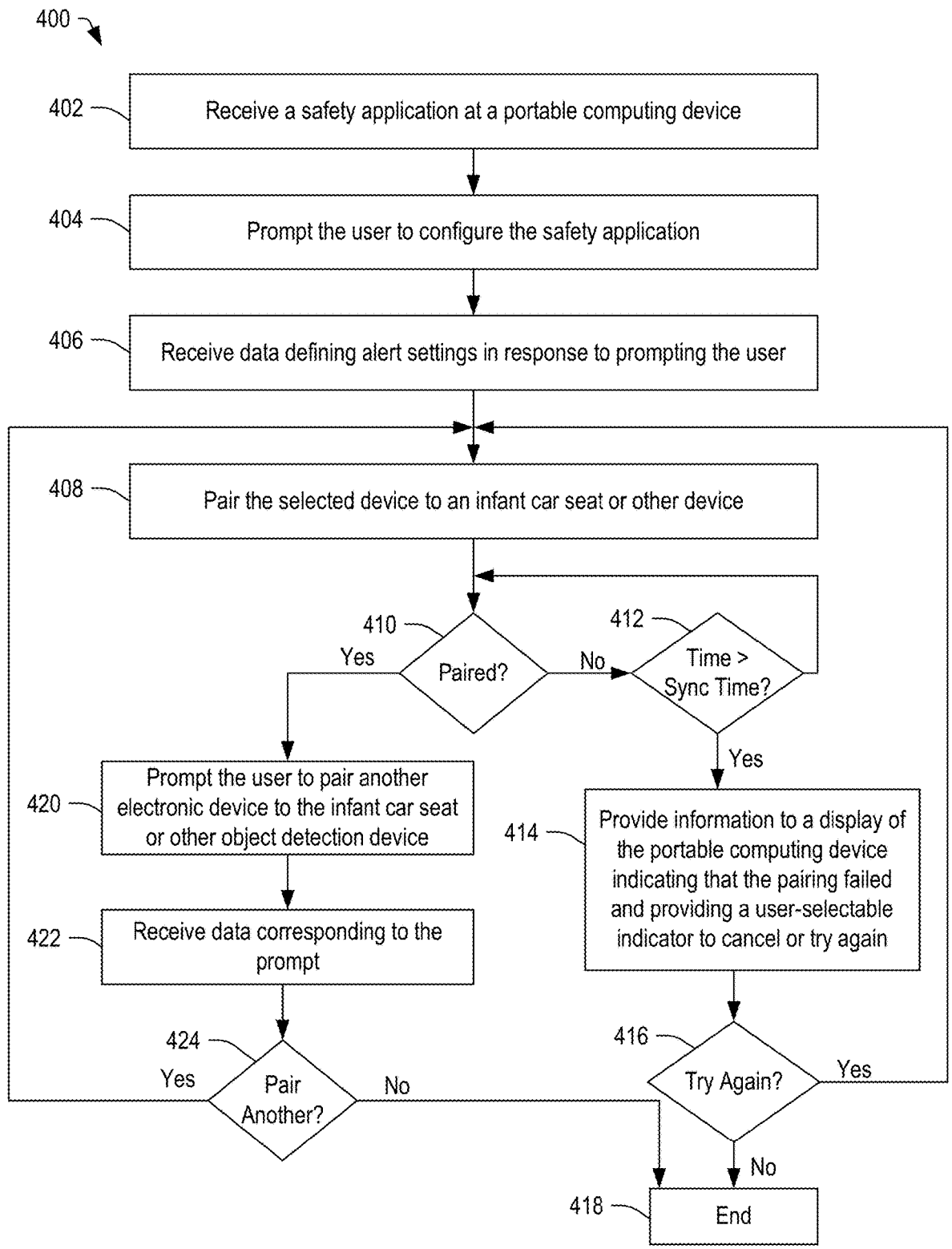
FIG. 4 depicts a flow diagram of a method of establishing communication links between a circuit and two or more electronic devices, in accordance with certain embodiments of the present disclosure.

FIG. 4 depicts a flow diagram of a method 400 of establishing communication links between a circuit and one or more electronic devices, in accordance with certain embodiments of the present disclosure. The circuit may be part of a device 102 or may be part of the automotive system 114. At 402, the method 400 may include receiving a safety application at a portable computing device. The portable computing device may receive the safety application by a user downloading the safety application from a website or application store.

At 404, the method 400 can include prompting the user to configure the safety application. The safety application may present a graphical interface including information and including user-selectable options accessible by a user to configure alert settings (such as phone numbers, secondary counter-measure numbers, time thresholds, and so on). Once the user has configured the safety application, the user may save the changes.

At 406, the method 400 can include receiving data defining alert settings in response to prompting the user. At 408, the method 400 can include pairing a selected device to an infant car seat or another device. In some embodiments, the safety application may trigger a Bluetooth® pairing operation during which the computing device may establish a communications link with a circuit of a device (such as an infant car seat).

At 410, if the device is not paired, the method 400 may include determining if the time is greater than a synchronization time, which is a time-out threshold for the synchronization process. At 412, if the time is not greater than a synchronization time, the method 400 returns to 410 to determine if the selected device is paired yet. Returning to 412, if the time is greater than the synchronization time, the method 400 may include providing information to a display of the portable computing device indicating that the pairing failed and providing a user-selectable indicator to cancel or try again, at 414. If, at 416, the user elects to try again, the method 400 returns to 408 to pair the selected device. Otherwise, the method 400 advances to 418 to end the process.

Returning to 410, if the device is successfully paired, the method 400 may include prompting the user to pair a second electronic device to the infant car seat or other object detection device, at 418. At 420, the method 400 can include prompting the user to pair another electronic device to the infant car seat or other object detection device.

At 422, the method 400 can further include receiving data corresponding to the prompt. At 424, if the data indicates no additional pairing, the method 400 may advance to 418 and end the process. Otherwise, at 424, if the data indicates pairing another device, the method 400 may return to 408 to pair the selected device.

It should be appreciated that the synchronization process described above with respect to FIG. 4 is illustrative only, and is not intended to be limiting. Further, it should be appreciated that the synchronization process may be performed multiple times to synchronize multiple portable electronic devices to the car seat or other device. Further, it should be understood that the synchronization process may be initiated from each device to be paired or from an interface provided on the infant car seat or other device. Other embodiments are also possible.

Figure 5:
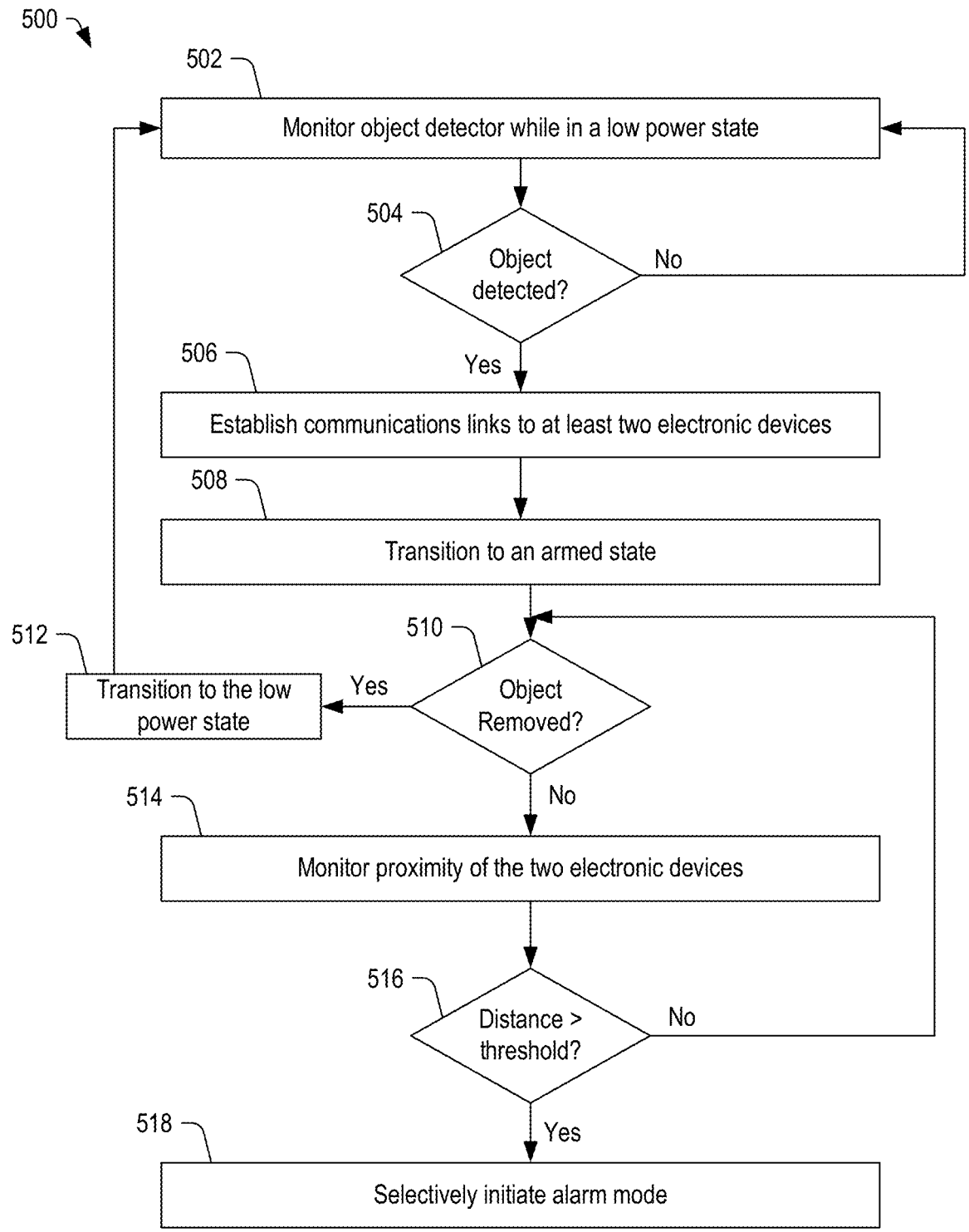
FIG. 5 depicts a flow diagram of a method of providing an automotive safety alerting system, in accordance with certain embodiments of the present disclosure.

FIG. 5 depicts a flow diagram of a method 500 of providing an automotive safety alerting system, in accordance with certain embodiments of the present disclosure. At 502, the method 500 may include monitoring an object detector while in a low power state. The monitoring may be performed by a logic circuit or other circuit component associated with a device, such as an infant car seat or a vehicle. The circuit may begin in a low-power state and may transition to other states based on detection of a mass (such as an infant), changes in the proximity of one or more electronic devices, activation of a door sensor, other events, or any combination thereof. In some embodiments, the object detector may include a transducer, such as a pressure transducer, an optical detector, a strain transducer, a force transducer, or another type of detector configured to detect the presence of a mass, such as an infant, a pet, groceries, or other items. In other embodiments, the circuit may determine the presence of an object based on the rear door opening and closing, for example, which may be indicative of a user placing an object in the back seat. In some implementations, the circuit may confirm the presence of the object based on a signal from a pressure sensor.

At 504, if the object is not detected, the method 500 returns to 502 to monitor the object detector. Otherwise, at 504, if the object is detected, the method 500 may include establishing communications links to one or more electronic devices, at 506. The one or more electronic devices may include a computing device, such as the smartphone 104, a fob 106 or or other wearable device, another data processing device, or any combination thereof.

At 508, the method 500 may include transitioning to an armed state. At 510, if the object is removed, the method 500 may include transitioning to the low power state, at 512. The method 500 may then return to 502 to monitor the object detector.

Returning to 510, if the object is not removed, the method 500 may include monitoring proximity of the one or more electronic devices, at 514. The proximity may be determined based on signal strength determined by the communication circuit of one of the electronic device and the infant car seat or other device, such as the automotive system 114.

At 516, if the proximity or distance is not greater than a threshold distance, the method 500 returns to 510 to determine if the object has been removed. Otherwise, at 516, if the distance is greater than the threshold, the method 500 may include selectively initiating an alarm mode, at 518.

In some embodiments, selectively initiating the alarm mode may include initiating a timer and generating one or more alert signals when the timer exceeds a time threshold. Further, in some embodiments, the alarm mode may escalate if the timer exceeds a second threshold. Other embodiments are also possible. Examples of a method of providing a safety alerting system that includes escalating alerting stages is described below with respect to FIGS. 6 and 8.

Figure 6:
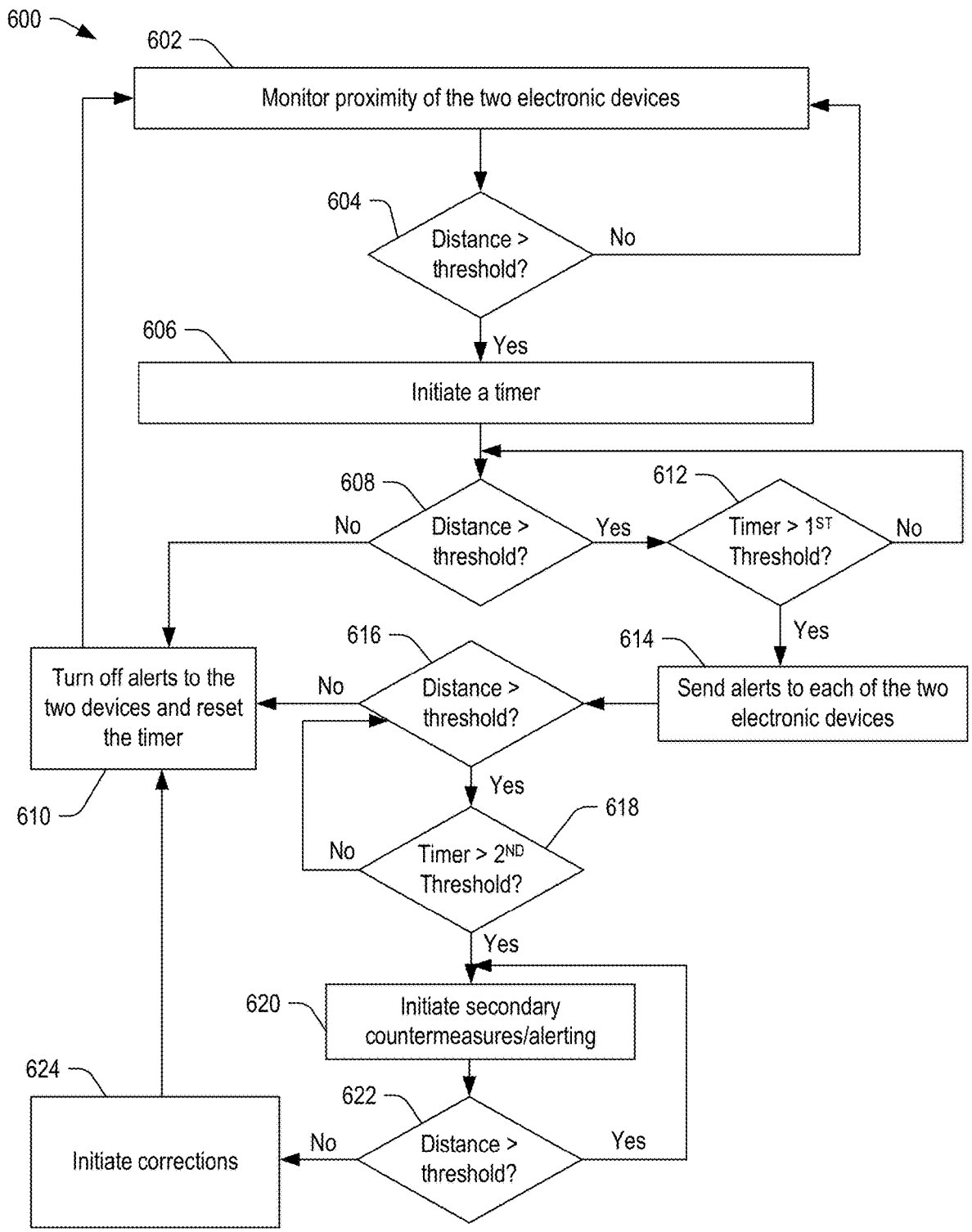
FIG. 6 depicts a flow diagram of a method of providing a safety alerting system, in accordance with certain embodiments of the present disclosure.

FIG. 6 depicts a flow diagram of a method 600 of providing a safety alerting system, in accordance with certain embodiments of the present disclosure. At 602, the method 600 may include monitoring proximity of one or more electronic devices. The proximity may be monitored based on changes in the signal strength of the communication link between the circuit and a portable electronic device. Alternatively, the proximity may be determined based on GPS data of the circuit relative to GPS data of the portable electronic device. Other embodiments are also possible.

At 604, if the distance is less than a threshold distance, the method 600 returns to 602 to continue to monitor the proximity. If, at 604, the distance is greater than a threshold, the method 600 may include initiating a timer, at 606. The timer may be hardware timer, a software timer, or any combination thereof.

At 608, if the distance is not greater than the threshold, the method 600 may include turning off alerts to the two devices and resetting the timer, at 610. The method 600 may then return to 602 to monitor the proximity of the electronic devices. Otherwise, at 608, of the distance is greater than the threshold, the method 600 may include determining if the timer count is greater than a first threshold. If not, the method 600 returns to 608 to determine if the distance is greater than the threshold.

At 612, if the timer exceeds the first threshold, the method 600 may include sending alerts to the one or more electronic devices, at 614. The alert may include a text message; a phone call; a signal causing an application executing on the computing device to generate an audio alert, a tactile alert (such as a vibration), a visual indicator (such as a flashing light, a visual display, or other visual indicator); or any combination thereof. In some implementations, in addition to or in lieu of sending the alerts, the automotive system 114 may activate a dashboard display, sound the car horn, flash lights (e.g., turn signals, headlights, brake lights, etc.), activate the cabin dome light, activate a device to project a heads up display on the windshield, activate the car speakers, initiate another detectable indicator, or any combination thereof.

At 616, if the distance is not greater than the threshold, the method 600 may include turning off alerts to the one or more devices and resetting the timer, at 610. In this instance, the user may have returned with one or more the electronic devices to the proximity of the device.

Otherwise, at 616, if the distance is still greater than the threshold, the method 600 may include determining if the timer exceeds a second threshold, at 618. At 618, if the timer is not greater than the second threshold, the method 600 returns to 616 to determine if the distance is greater than the threshold. Otherwise, at 618, if the timer is greater than the second threshold, the method 600 may include initiating secondary countermeasures or alerting procedures, at 620. The secondary countermeasures or alerting may include contacting secondary contacts in a list, contacting first responders (such as the fire department, law enforcement, and the like), or initiating other contacts or alerts. For example, the automotive system 114 may send an alert to emergency personnel, send a text message to a smartphone, and so on.

The method 600 may further include monitoring the proximity to determine if the distance is greater than a threshold. At 622, if the distance is greater than the threshold, the method 600 returns to 620 to continue initiating secondary countermeasures or alerting. Otherwise, at 622, if the distance is not greater than the threshold, the method 600 may include initiating corrections, at 624. In some embodiments, the corrections may include updating the alerts by sending update information to the one or more computing devices and to the secondary countermeasures or alerting devices. Other embodiments are also possible.

It should be appreciated that the alerting functionality may vary depending on the implementation. In an example, the alert may be triggered by an application executing on each of the electronic devices or by an application integrated within the automotive system 114 of the vehicle. For example, upon arming of the system to monitor the presence of the mass and the proximity of the electronic devices, the circuit may send a signal causing instructions or an application stored on the computing device and in the fob 106 or other wearable device to activate, and may monitor the signal strength of the communication link with the circuit. If the signal strength falls below a threshold signal strength level, the instructions may cause the processor of the associated portable device (i.e., smartphone 104, other computing device, fob 106 or other wearable device, or any combination thereof) to determine that the distance of the portable device from the circuit is greater than a predetermined threshold distance, which determination may cause the application on the portable device to initiate the timer on the portable device. Once the timer exceeds a first time threshold, the processor of the portable device may cause the portable device to vibrate, emit a sound, generate a visual indicator, or any combination thereof. If the timer exceeds a second time threshold, the processor of the portable device may cause the portable device to initiate secondary countermeasures or alerting.

The automotive system 114 may have a similar timer mechanism. When the timer value exceeds a threshold value, the automotive system 114 may activate one or more components of the car to provide a visible or audible alert for the user or for people nearby. The automotive system 114 may also send messages and optionally alert emergency personnel. Other implementations are also possible.

If, after initiation of the timer, the signal strength as measured by the portable device exceeds a signal strength threshold, the portable device may be within the predetermined threshold distance. The portable device may initiate corrections and may prompt the user through one or more further steps to make sure that the infant or other object is attended to. Other embodiments are also possible.

Figure 7:
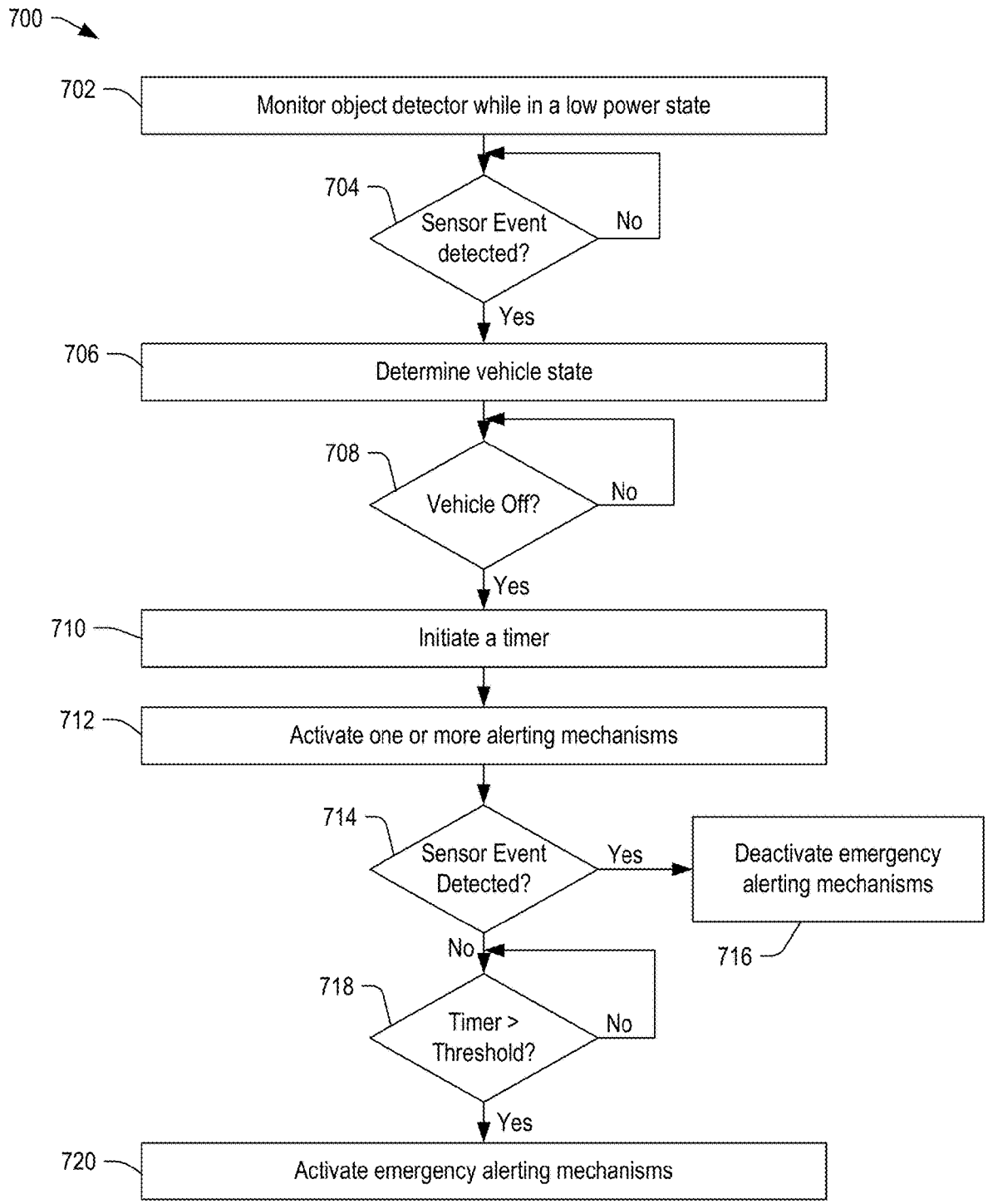
FIG. 7 depicts a flow diagram of a method of providing a safety alerting system using an integrated automotive system, in accordance with certain embodiments of the present disclosure.

FIG. 7 depicts a flow diagram 700 of a method of providing a safety alerting system using an integrated automotive system 114, in accordance with certain embodiments of the present disclosure. At 702, one or more sensors are monitored while in a low power state. The one or more sensors may include pressure sensors, door sensors, other sensors, or any combination thereof.

At 704, the system determines whether a sensor event is detected. If not, the method continues to wait for detection of a sensor event. Otherwise, if a sensor event is detected at 704, the system determines a vehicle state, at 706. For example, the automotive system 114 may determine whether the vehicle is running and may determine a proximity of a person in possession of the key fob 106 or other wearable device relative to the vehicle. The automotive system 114 may also determine a cabin temperature of the vehicle, other parameters, or any combination thereof.

At 708, if the vehicle is running, the method waits for the vehicle to turn off. Otherwise, at 708, if the vehicle is turned off, the automotive system 114 may initiate a timer, at 710. At 712, the automotive system 114 may activate one or more alerting mechanisms. For example, the automotive system 114 may activate a cabin dome light and maintain the light in an on state until an object is removed from a rear seat. In another example, the automotive system 114 may activate the dashboard display, a heads up display or projected display, headlights of the vehicle, the car speakers, the car horn, or any combination thereof to remind the user to check the back seat or to remove the object. Other options are also possible.

At 714, the automotive system 114 may determine whether a sensor event is detected. If the sensor event is detected at 714 that is indicative of removal of the object, the automotive system 114 may deactivate the emergency alerting mechanisms, at 716. Otherwise, the automotive system 114 may determine whether the timer is greater than a threshold 718. If the timer value is less than the threshold value, the method may return to 714 to check for a sensor event.

Otherwise, if the timer value exceeds the threshold value, the automotive system 114 may activate emergency alerting mechanism, at 720. For example, the automotive system 114 may send a message to an online system, such as an automotive assistance center, emergency services, and so on. In addition or in the alternative, the automotive system 114 may send a message to one or more smartphones. In some implementations, the automotive system 114 may escalate the emergency alerting mechanisms. Other implementations are also possible.

Figure 8:
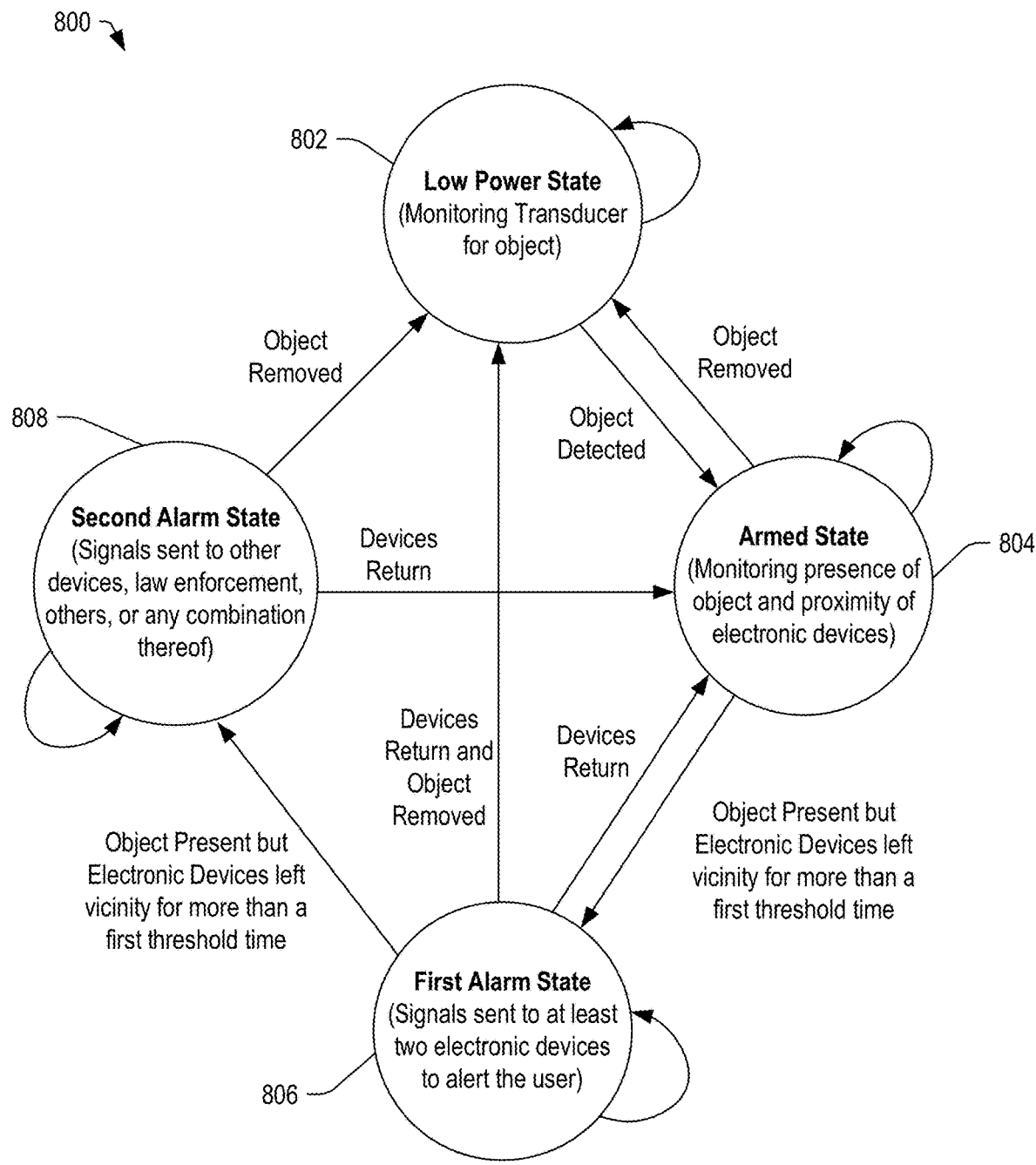
FIG. 8 depicts a state diagram of operating states of a circuit of the safety alerting system, in accordance with certain embodiments of the present disclosure.

FIG. 8 depicts a state diagram 800 of operating states of a circuit of the safety alerting system, in accordance with certain embodiments of the present disclosure. The state diagram 800 includes a low power state 802 in which a circuit monitors a transducer for the presence of an object. The transducer may include a pressure transducer, an optical transducer, an audio transducer, another type of transducer, or any combination thereof, which can be configured to detect the presence of a mass, such as an infant, an object, another item, or any combination thereof. As shown in the state diagram 800, the circuit may remain in the low power state 802 until an object is detected.

Once an object is detected, the circuit may transition from the low power state 802 to an armed state 804, in which the circuit monitors the presence of the object and the proximity of two or more electronic devices. The circuit may monitor the presence of the object by continuing to monitor the transducer for the presence of the object and may monitor proximity by comparing GPS data of the circuit to the portable device or by monitoring the signal strength of a communications link between the portable device and the circuit. If the object is removed, the circuit may transition from the armed state 804 back to the low power state 802. Otherwise, the circuit may remain in the armed state 804 until the proximity of one of the electronic devices changes, such that a distance between the electronic device and the circuit exceeds a threshold distance.

Once the electronic device moves outside of the threshold radius or distance, the circuit may transition from the armed state 804 to a first alarm state 806. In this state, the circuit (or one of the electronic devices) may initiate a timer. If the electronic device returns to the vicinity of the circuit, the circuit may transition back to the armed state 804. Otherwise, in the first alarm state 806, the circuit may remain in the first alarm state until the timer exceeds a threshold time, at which time the circuit (or one of the electronic devices) may send or otherwise initiate an alert. If the electronic device returns and the object is removed, the circuit may transition from the first alarm state to the low power state 802.

If the object or mass is still present and the electronic device is still outside of the threshold proximity of the circuit, after the time exceeds a second time threshold, the circuit may transition from the first alarm state 806 to a second alarm state 808. In the second alarm state, the circuit or an app executing on one of the electronic devices may send signals to other devices, to law enforcement, to others, or any combination thereof. If the electronic device returns to the proximity of the circuit, the circuit may transition to the armed state 804. If the object is removed, the circuit may transition from the second alarm state 808 to the low power state 802.

It should be appreciated that the state diagram 800 is provided for illustrative purposes only, and that the number of states and the interrelationship between each of the states may vary based on the implementation. Further, it should be appreciated that the states 800 may be implemented across multiple devices and circuits. In an example, the first and second alarm states 806 and 808 may be implemented on a fob 106 or other wearable device, a smartphone 104, or another portable communications device based on signal strength or GPS data as described above. In this example, the circuit embedded within or coupled to an infant car seat, a cover, another device, or any combination thereof may be configured to transition between the low power state 802 and the armed state 804. In other embodiments, the circuit may be configured to transition between all of the states 802, 804, 806, and 808. Other embodiments are also possible.

Figure 9:
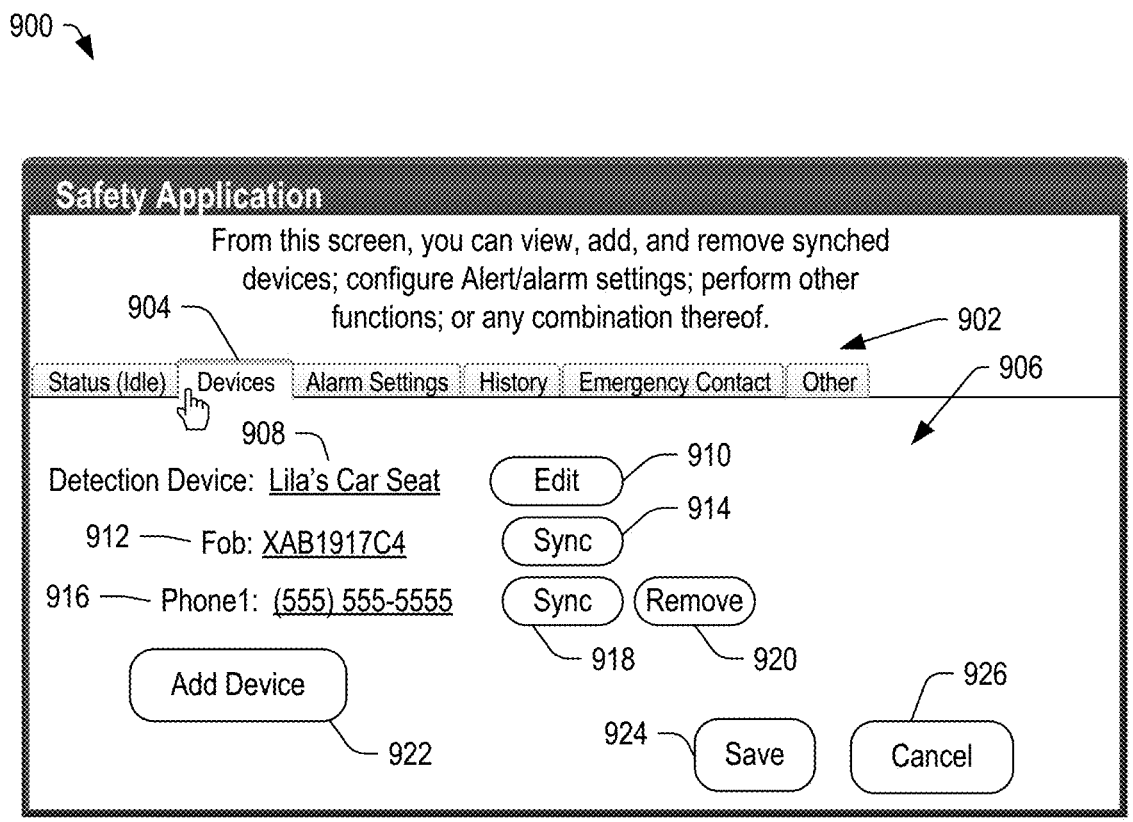
FIG. 9 depicts a graphical interface accessible by a user to configure a safety alerting system, in accordance with certain embodiments of the present disclosure.

FIG. 9 depicts a graphical interface 900 accessible by a user to configure a safety alerting system, in accordance with certain embodiments of the present disclosure. The graphical interface 900 may be provided by the GUI module of the safety application executing on a portable computing device, such as a smartphone, a tablet computer, or another computing device. In an example, the user may interact with the graphical interface 900 via a touchscreen or other input interface (such as a computer display and a keyboard). Other embodiments are also possible.

The graphical interface 900 can include a plurality of user-selectable elements, such as buttons, tabs, clickable links, checkboxes, radio buttons, text fields, pulldown menus, other selectable elements, or any combination thereof. In this example, the graphical interface 900 may include a plurality of tabs 902, including a "Status" tab, a "Devices" tab, an "Alarm Settings" tab, a "History" tab, an "Emergency Contact" tab, an "Other" tab, optionally other tabs, or any combination thereof. In this example, the "Status" tab shows a current status of "Idle," and the "Devices" tab 904 has been selected and is the foreground tab, revealing a devices panel 906.

The devices panel 906 may include a detection device 908, which can be labeled or named. Further, the devices panel 906 may include an "Edit" button 910, which may be selected by the user to rename the detection device 908 or to otherwise edit settings associated with the detection device. In this instance, the detection device 908 is labeled "Lila's Car Seat."

The devices panel 906 may further include a fob identifier 912 that is paired with the detection device. The fob identifier 912 may include a preassigned identifier, such as a serial number assigned by a manufacturer. The fob identifier 912 may have an associated "Sync" button 914, which may be accessed by the user to initiate a synchronization operation. Other embodiments are also possible.

The devices panel 906 may further include a phone number field 916 including a phone number of a phone paired with the detection device. Further, the devices panel 906 may include a "Sync" button 918, a "Remove" button 920, other buttons, or any combination thereof. Further, the devices panel 906 may include an "Add Device" button 922, a "Save" button 924, and a "Cancel" button 926.

In some embodiments, selection of the "Emergency Contact" tab causes the graphical interface 900 to present an Emergency Contact panel that may include one or more fields (such as a text field, checkboxes, buttons, or other user-selectable elements) with which a user may interact to add or define one or more emergency contacts that the system will contact when the circuit determines that a proximity of one of the electronic devices is outside of a distance threshold for more than a second period of time (as discussed above). Other embodiments are also possible.

It should be appreciated that the graphical interface 900 may represent one possible example of an interface that can be implemented on a computing device, such as the smartphone or a tablet computer. The graphical interface 900 can be configured to provide a battery status and other status indicators relating to the detection circuit, the fob 106 or other wearable device, other devices, or any combination thereof.

Figure 10:
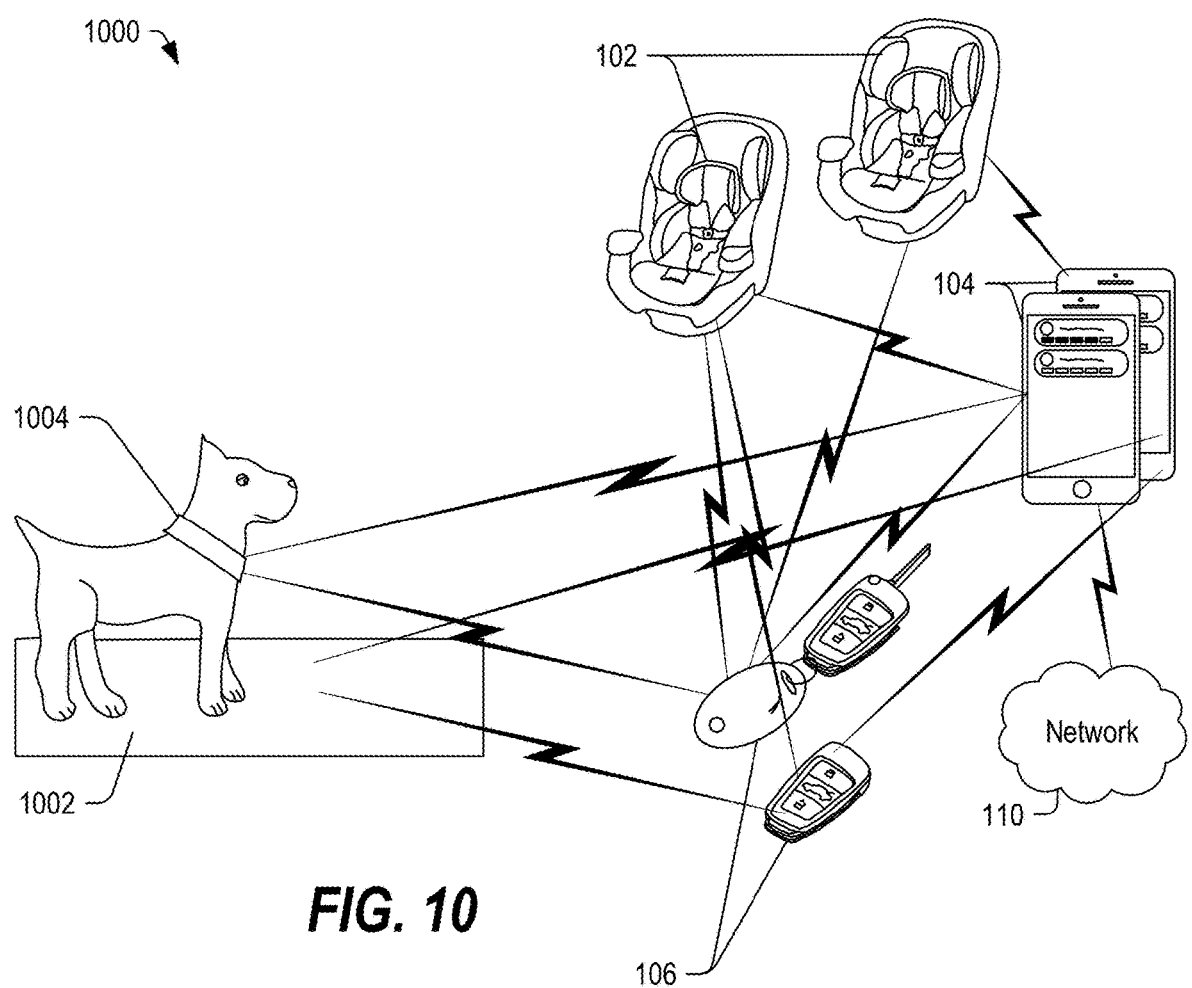
FIG. 10 depicts a diagram of a system including a pair of infant car seats, a pad, a pair of key fobs, and a pair of smartphones configured to communicate via a network, in accordance with certain embodiments of the present disclosure.

FIG. 10 depicts a diagram of a system 1000 including a pair of infant car seats 102, a pad 1002, a pair of fobs 106 or other wearable devices, and a pair of smartphones 104 configured to communicate via a network 112, in accordance with certain embodiments of the present disclosure. In an example, the network 112 can include a communications network, such as a cellular, digital, or satellite network. Further, the network 112 can include a network provided by a transceiver of a circuit within the infant car seats 102 or within the pad 1002.

In the illustrated example, the pad 1002 can include a circuit enclosed within a waterproof form factor. The circuit may be configured to detect the presence of a mass, such as the dog, chemicals, liquids, food items, and so on. Further, the system 1000 can include a pet collar 1004 that can also communicate with the fobs 106 or other wearable devices and the smartphone 104 via the network 112. It should be appreciated that the fob 106 may be an attached keychain element or may be integrated within the automobile key. Other implementations are also possible.

In some embodiments, the system 1000 may include the features and functions and may operate as described above with respect to the systems, devices, and methods described above with respect to FIGS. 1-9. However, the system 1000 includes multiple detection circuits that can be networked wirelessly to multiple controllers, e.g., multiple fobs 106 or other wearable devices, multiple smartphones 104, other devices, or any combination thereof. In this example, each circuit may be configured to initiate an alert independently of the other circuits based on detection of a mass, proximity of one or more of the linked electronic devices, and a time during which a proximity of at least one of the linked electronic devices is outside of a distance threshold. Other embodiments are also possible.

Figure 11:
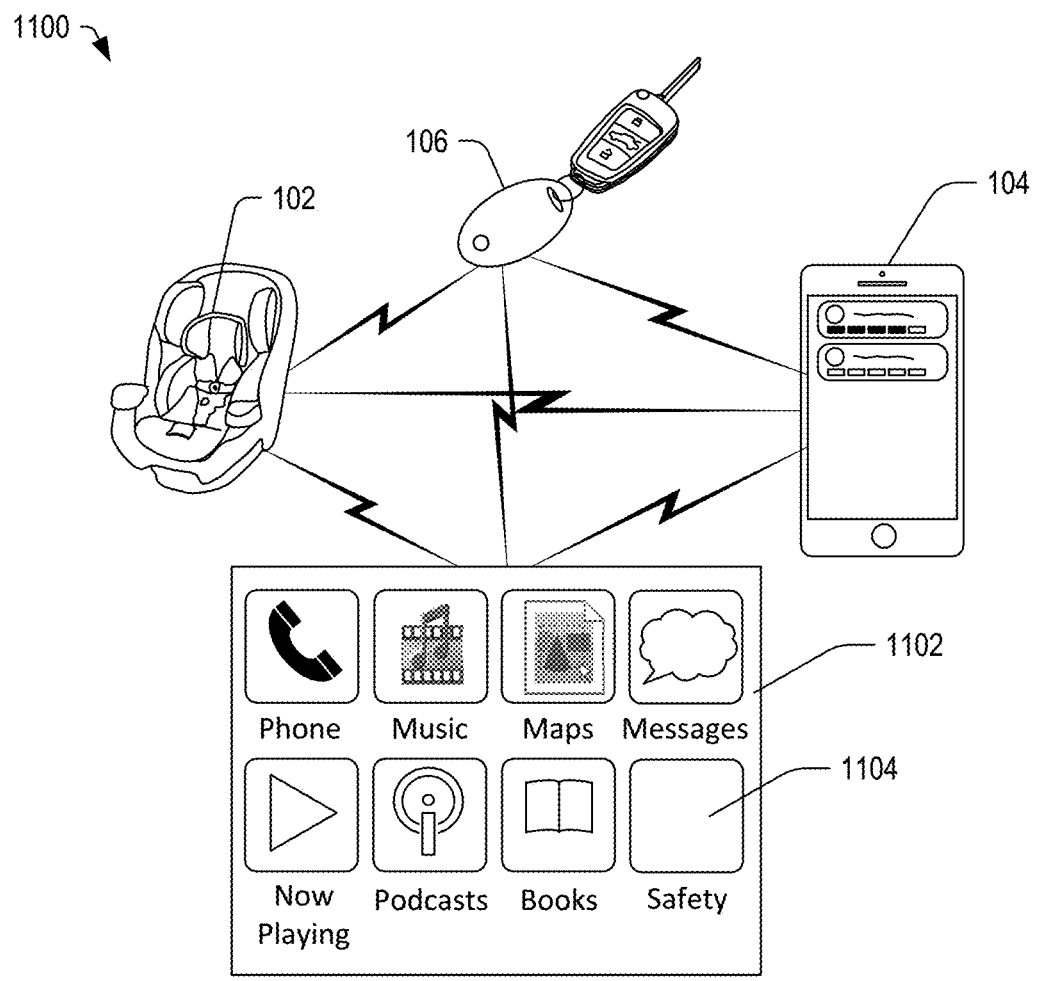
FIG. 11 depicts a diagram of a system including an infant car seat, a smartphone, and an automotive system interface configured to communicate via wireless communications links, in accordance with certain embodiments of the present disclosure.

FIG. 11 depicts a diagram of a system 1100 including an infant car seat 102, a smartphone 104, and an automotive system interface 1102 configured to communicate via wireless communications links, in accordance with certain embodiments of the present disclosure. In an example, the automotive system interface 1102 of an automobile, such as a car or truck, may include a touchscreen configured to display information and to receive user inputs. The automotive system interface 1102 may be configured to communicate wirelessly with the infant car seat 102, the smartphone 104, one or more wearable devices (such as the key fob 106), other devices, or any combination thereof. The automotive system interface 1102 may communicate wirelessly using a Bluetooth® wireless communications link, another short-range wireless communications link, or any combination thereof. In this example, the infant car seat 102 may connect to the car's automotive system interface 1102, which in turn can communicate with the user's smartphone 104, key fob 106 or other wearable device, or another electronic device.

In one implementation, a safety application 1104 may be included in the integrated system applications or may be accessed via synchronization with a mobile device, such as the smartphone. The safety application 1104 may be accessed via the interface 1102 (or via the smartphone 104) to configure various alerting options. Other implementations are also possible.

Figure 12:
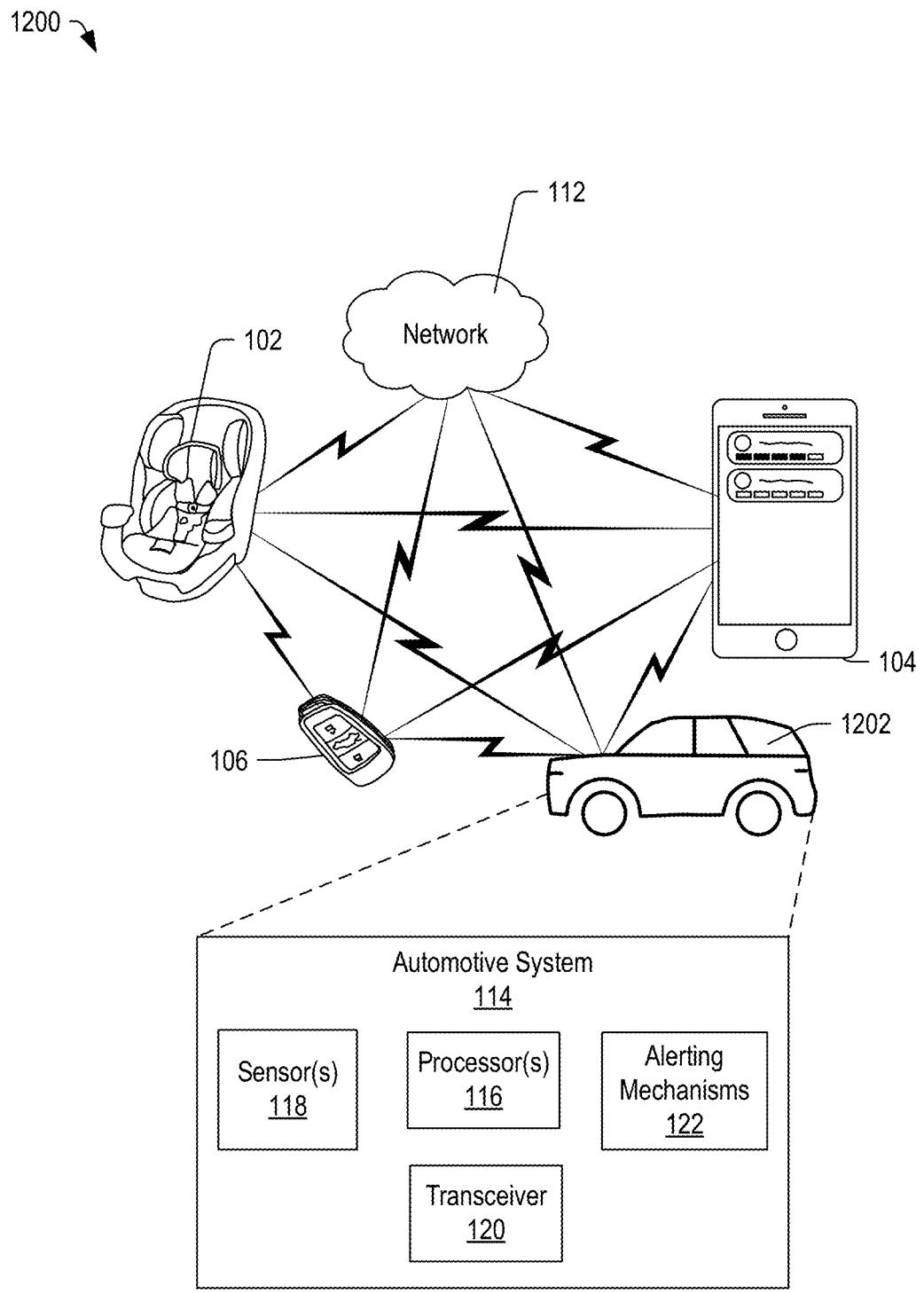
FIG. 12 depicts a diagram of an automotive safety alerting system, in accordance with certain embodiments of the present disclosure.

FIG. 12 depicts a diagram of an automotive safety alerting system 1200, in accordance with certain embodiments of the present disclosure. The automotive alerting system 1200 may include all of the elements of the system 100 of FIG. 1, but may also include Bluetooth® communications links forming a network mesh between the infant car seat 102, the key fob 106, the smartphone 104, and an automotive interface 114 of a car 1202.

In some implementations, the circuit of the car seat 102 and the circuitry of the key fob 106 may communicate with the automotive system interface of the car 1202, which may in turn communicate with the user's smartphone 104. Other embodiments are also possible.

The car 1202 may include the automotive system 114 including a processor 116, one or more sensors 118, one or more transceivers 120, and one or more alerting mechanisms 122. As discussed above, the automotive system 114 may include integrated detection systems to detect car door opening events, seat pressure, temperature sensors, and so on. In response to one or more detection events, the automotive system 114 may activate one or more of the alerting mechanisms 122. Such alerting mechanisms 122 may include activating the indoor cabin light, activating or flashing the headlights, activating the car horn, activating the car's sound system, presenting data on a dashboard display, and so on. Such alerting mechanisms 122 may also include communicating data to one or more of the smartphone 104, the key fob 106 or other wearable device, another electronic device, or even an emergency system through the network 112. Further, in some implementations, the automotive system 114 may be configured to activate the heating and ventilation system of the vehicle 1202 to turn on the air conditioning system and optionally to open one or more windows to facilitate ventilation. Other implementations are also possible.

In conjunction with the systems, devices, methods, and diagrams described above with respect to FIGS. 1-12, an apparatus is disclosed that may be configured to detect the presence of a mass, such as an infant, and, in response to detecting the mass, may establish communications links with two or more devices, such as a key fob, a smartphone, another electronic device, or any combination thereof. The apparatus may be configured to detect the proximity of the two or more devices and, generate an alert to one or more of the devices when the proximity is greater than a distance threshold from the apparatus for more than a threshold period of time and the mass is still detected.

In a particular example where the apparatus is an infant car seat, when an infant is left in the car seat and a proximity of either of the two or more devices exceeds a threshold distance from the apparatus, the apparatus may cause the devices to emit a sound, a visual indicator, a vibration, other alert, or any combination thereof when the proximity is greater than the threshold distance for a period of time that exceeds a predetermined threshold time. Further, if the device does not return to the proximity or the infant is not removed from the car seat within a second threshold time, the apparatus may send a message to an emergency response system or to another electronic device. Other embodiments are also possible.

Although the present invention has been described with reference to preferred embodiments, workers skilled in the art will recognize that changes may be made in form and detail without departing from the scope of the invention.

What is claimed is:

1. An apparatus comprising:
an interface to communicate with one or more devices;
one or more sensors; and
a processor coupled to one or more components of a vehicle and to the one or more sensors, the processor configured to:
determine presence of an object based on a first signal from a first sensor of the one or more sensors;
determine proximity of the one or more devices relative to the interface;
send an alert to at least one of the one or more devices in response to the proximity being greater than a threshold proximity; and
send a control signal to the one or more components of the vehicle to provide one or more of an audible indicator or a visual indicator of the presence of the object in response to the proximity being greater than a threshold proximity.

2. The apparatus of claim 1, wherein:
the one or more components of the vehicle include one or more of a car speaker or a car horn; and
the processor controls one or more of the car speaker or the car horn to produce an audible indicator.

3. The apparatus of claim 1, wherein:
the one or more components of the vehicle include one or more of an interior light, an exterior light, a dashboard display, or an augmented display; and
the processor controls one or more of the interior light, the exterior light, the dashboard display, or the augmented display to provide a visible indicator of the presence of the object.

4. The apparatus of claim 1, wherein the processor is configured to send an alert through the interface to the one or more devices when the proximity is greater than the threshold proximity for more than a period of time.

5. The apparatus of claim 4, wherein the processor is configured to send a second alert through the interface to an emergency system when the proximity is greater than the threshold proximity for more than a second period of time.

6. The apparatus of claim 1, wherein the interface, the one or more sensors, and the processor are integrated within a vehicle.

7. The apparatus of claim 1, wherein the interface, the one or more sensors, and the processor are integrated within one or more of a seat cover, a car seat, or a pad.

8. A system comprising:
a fob or wearable device, the fob or the wearable device including a transceiver and an indicator element; and
an apparatus including a circuit, the circuit including:
an interface including a transceiver to communicate with one or more of the fob, the wearable device, or one or more communication devices;
one or more-transducers configured to generate a signal in response to a presence of a mass; and
a processor coupled to the transceiver and the one or more transducers, the processor configured to:
determine the presence of a mass based on the signal from the one or more transducers;
determine a proximity of the one or more of the fob, the wearable device, or the one or more communication devices relative to the interface;
determine if the proximity exceeds a threshold proximity; and
in response to determining the proximity exceeds the threshold proximity, send a signal to the one or more of the fob, the wearable device, or the one or more communication devices indicative of the presence of the mass.

9. The system of claim 8, wherein the indicator element includes one or more of a light-emitting diode, an audio circuit, or a haptic feedback mechanism configured to cause the fob or the wearable device to vibrate.

10. The system of claim 8, wherein the processor is further configured to:

monitor a first proximity of the fob or the wearable device and at least one second proximity of at least one device of the one or more communication devices relative to the interface; and send a signal indicative of the presence of the mass to the fob or the wearable device and to the at least one device when the first proximity or the at least one second proximity is greater than the threshold distance from the interface for more than a first period of time.

11. The system of claim 10, wherein the processor is further configured to send a second signal indicative of the presence of the mass to one or more of an emergency system or the one or more communication devices when the first proximity and the at least one second proximity are greater than the threshold for more than a second period of time.

12. The system of claim 8, wherein the fob provides a detectable alert via the indicator element when the proximity of the fob or the wearable device relative to the interface of the circuit is greater than the threshold proximity for more than a first period of time.

13. The system of claim 8, wherein the apparatus includes one or more of an infant car seat, a convertible car seat, a booster seat, a pad, or a seat cover.

14. The system of claim 8, wherein the apparatus is integrated within a vehicle.

15. An apparatus comprising:
an interface to communicate with one or more devices;
one or more components including one or more of a light-emitting component, a sound-emitting component, or a haptic component;
one or more sensors; and
a processor coupled to the one or more components and to the one or more sensors, the processor configured to:
determine presence of an object based on a first signal from a first sensor of the one or more sensors;
determine proximity of one or more devices relative to the interface; and
control at least one component of the one or more components to provide one or more of an audible indicator or a visual indicator of the presence of the object in response to the proximity being greater than a threshold proximity.

16. The apparatus of claim 15, wherein:
the sound-emitting component includes one or more of a car speaker or a car horn; and
the processor controls the one or more of the car speaker or the car horn to produce an audible indicator.

17. The apparatus of claim 15, wherein:
the light-emitting component includes one or more of an interior light, an exterior light, a dashboard display, or an augmented display; and
the processor controls one or more of the interior light, the exterior light, the dashboard display, or the augmented display to provide a visible indicator of the presence of the object.

18. The apparatus of claim 15, wherein the processor is configured to send an alert through the interface to the one or more devices when the proximity is greater than the threshold proximity for more than a period of time.

19. The apparatus of claim 18, wherein the processor is configured to send a second alert through the interface to an emergency system when the proximity is greater than the threshold proximity for more than a second period of time.

20. The apparatus of claim 15, wherein the interface, the one or more components, the one or more sensors, and the processor are integrated within a vehicle.

21. The apparatus of claim 15, wherein the one or more components includes a haptic feedback element associated with a steering wheel of a vehicle and responsive to a control signal from the processor to provide haptic feedback.

* * * * *